US009223857B2

(12) United States Patent
Goedde et al.

(10) Patent No.: US 9,223,857 B2
(45) Date of Patent: Dec. 29, 2015

(54) SYSTEMS AND METHODS FOR GENERATING A TWO-DIMENSIONAL GRAPHICAL GRID REPRESENTATION OF THE TREATMENT OF A DOCUMENT

(75) Inventors: Thomas J. Goedde, Piqua, OH (US); Richard D. Miller, Yellow Springs, OH (US); Jacob Aaron Myers, Dayton, OH (US); Gaurav Mehra, Mason, OH (US); Lisa Peterson, Colorado Springs, CO (US)

(73) Assignee: LexisNexis, a division of Reed Elsevier Inc., Miamisburg, OH (US)

( * ) Notice: Subject to any disclaimer, the term of this patent is extended or adjusted under 35 U.S.C. 154(b) by 557 days.

(21) Appl. No.: 13/473,102

(22) Filed: May 16, 2012

(65) Prior Publication Data

US 2013/0104019 A1 Apr. 25, 2013

Related U.S. Application Data

(60) Provisional application No. 61/550,567, filed on Oct. 24, 2011.

(51) Int. Cl.
*G06F 17/30* (2006.01)
(52) U.S. Cl.
CPC .... *G06F 17/30716* (2013.01); *G06F 17/30728* (2013.01)
(58) Field of Classification Search
USPC ......................................... 715/212, 215, 217
See application file for complete search history.

(56) References Cited

U.S. PATENT DOCUMENTS

| | | | | |
|---|---|---|---|---|
| 5,510,980 | A * | 4/1996 | Peters | 715/205 |
| 5,544,352 | A * | 8/1996 | Egger | 707/999.005 |
| 5,832,494 | A * | 11/1998 | Egger et al. | 707/999.005 |
| 6,233,571 | B1 * | 5/2001 | Egger et al. | 707/999.002 |
| 7,299,406 | B2 * | 11/2007 | Schnurr | 715/212 |
| 7,529,756 | B1 | 5/2009 | Haschart et al. | |
| 7,840,524 | B2 * | 11/2010 | Egger et al. | 707/709 |
| 8,024,650 | B2 * | 9/2011 | Carlson et al. | 715/212 |
| 8,312,366 | B2 * | 11/2012 | Folting | 715/212 |
| 8,555,196 | B1 * | 10/2013 | Egger et al. | 715/788 |
| 2002/0091679 | A1 | 7/2002 | Wright | |
| 2005/0010862 | A1* | 1/2005 | Bauchot | 715/504 |
| 2005/0149343 | A1 | 7/2005 | Rhoads et al. | |
| 2006/0242564 | A1* | 10/2006 | Egger et al. | 715/513 |

(Continued)

OTHER PUBLICATIONS

How to Shepardize; 2004; LexisNexis; 32 Pages.*

(Continued)

*Primary Examiner* — Andrew Dyer
(74) *Attorney, Agent, or Firm* — Dinsmore & Shohl LLP

(57) ABSTRACT

Systems and methods for generating a two-dimensional graphical grid representation of the treatment of a document are disclosed. A method includes receiving a request to generate the two-dimensional graphical grid representation of the treatment of the document with respect to at least one variable. In response to the received request, the method further includes retrieving, by a computer, treatment information associated with the document with respect to the at least one variable from a database. The method further includes generating a message containing the retrieved treatment information of the document with respect to the at least one variable, transmitting the generated message, and providing for display the two-dimensional graphical grid representation of the treatment of the document with respect to the at least one variable based on the transmitted message.

19 Claims, 5 Drawing Sheets

(56) References Cited

U.S. PATENT DOCUMENTS

| | | | |
|---|---|---|---|
| 2006/0248440 A1 | 11/2006 | Rhoads et al. | |
| 2007/0016848 A1 | 1/2007 | Rosenoff et al. | |
| 2007/0050700 A1* | 3/2007 | Simkhay et al. | 715/503 |
| 2008/0082929 A1 | 4/2008 | Stignani et al. | |
| 2008/0178077 A1 | 7/2008 | Boucher | |
| 2009/0063947 A1* | 3/2009 | Anderson | 715/212 |
| 2009/0076836 A1* | 3/2009 | Arvidson et al. | 705/1 |
| 2009/0187567 A1 | 7/2009 | Rolle | |
| 2009/0187815 A1* | 7/2009 | Becerra et al. | 715/212 |
| 2010/0030749 A1 | 2/2010 | Dahn | |
| 2010/0115401 A1 | 5/2010 | Nordine et al. | |
| 2010/0131544 A1* | 5/2010 | Kilgour | 707/769 |
| 2010/0185962 A1 | 7/2010 | Zhang et al. | |
| 2010/0241947 A1* | 9/2010 | Dahn et al. | 715/233 |
| 2010/0250550 A1* | 9/2010 | Tereposky et al. | 707/741 |
| 2010/0318509 A1* | 12/2010 | McBeath et al. | 707/713 |
| 2010/0332520 A1 | 12/2010 | Lu et al. | |
| 2011/0072340 A1* | 3/2011 | Miller et al. | 715/220 |
| 2012/0047127 A1* | 2/2012 | McBeath et al. | 707/722 |
| 2013/0246445 A1* | 9/2013 | Tobin et al. | 707/756 |

OTHER PUBLICATIONS

Shepardizing; 2008; LexisNexis; 4 Pages.*
McKenzie; New Kid on the Block: KeyCite Compared to Shepard's; Oct. 1, 1999; Suffolk University Law School Faculty Publications; pp. 1-25.*
How to Check Citations; Jun. 1, 2010; Thomson Reuters; pp. 1-4.*

* cited by examiner

SYSTEMS AND METHODS FOR GENERATING A TWO-DIMENSIONAL GRAPHICAL GRID REPRESENTATION OF THE TREATMENT OF A DOCUMENT

CLAIM OF PRIORITY

This application claims the benefit of U.S. Provisional Application No. 61/550,567, entitled "Systems and Methods for Creating Appellate History Maps and Citing Decisions Grids," filed Oct. 24, 2011, the entirety of which is hereby incorporated by reference.

BACKGROUND

1. Field

The present specification generally relates to generating a graphical representation and, more particularly, to systems and methods for generating a two-dimensional graphical grid representation of the treatment of a document.

2. Technical Background

A document (e.g., a legal document, such as a court decision or opinion, statute, administrative regulation, etc.) may be cited, or otherwise referred to/analyzed, by subsequent documents ("citing documents"). If a user is viewing a document on a graphical screen of a computing device, the user may be provided an option to view information related to the corresponding citing documents. Upon selecting to view information related to the corresponding citing documents, a list of the citing documents may be presented to the user in a textual list view. For example, the citing documents may be grouped in a number of categories and a list of the citing documents falling within each category may be displayed. For example, citing court decisions may be categorized by jurisdiction and displayed in lists under the labels associated with the appropriate categories (e.g., the citation (or other data identifying a court decision) of every citing decision issued by 2nd Circuit U.S. District Courts may be displayed under a "2nd Circuit—U.S. District Courts" label).

A treatment type may be displayed along with the citation of each citing document in order to indicate the manner in which each particular citing document treated the cited document. For example, the treatment type may be "Warning," "Questioned," "Caution," "Positive," "Neutral," or "Cited By." Accordingly, a user may be presented with a list of citing documents grouped into categories where each citing document also includes a textual or graphical indication of the way in which that citing document treated the cited document.

A user may wish to quickly and easily understand the way in which a cited document has been treated among jurisdictions. A user may also wish to quickly and easily understand the way in which a cited document has been treated over time. However, it may be burdensome and/or impractical for a user to scroll through and scan through an entire list of citing documents in order to understand the way in which the document has been treated among jurisdictions or over time.

Accordingly, a need exists for systems and methods of generating a two-dimensional graphical grid representation of the treatment of a document.

SUMMARY

In one embodiment, a method for providing for display a two-dimensional graphical grid representation of the treatment of a document with respect to at least one variable includes receiving a request to generate the two-dimensional graphical grid representation of the treatment of the document with respect to the at least one variable. In response to the received request, the method further includes retrieving, by a computer, treatment information associated with the document with respect to the at least one variable from a database. The method further includes generating a message containing the retrieved treatment information of the document with respect to the at least one variable, transmitting the generated message, and providing for display the two-dimensional graphical grid representation of the treatment of the document with respect to the at least one variable based on the transmitted message.

In another embodiment, a method for providing for display a grid comprising a matrix of cells, in which the grid is a two-dimensional graphical representation of the treatment of a legal document with respect to time or jurisdiction, includes receiving a request to generate the grid. In response to the received request, the method further includes retrieving, by a computer, treatment information associated with the legal document with respect to time or jurisdiction from a database. The method further includes generating a message containing the retrieved treatment information of the legal document with respect to time or jurisdiction, transmitting the generated message, and providing for display the grid based on the transmitted message. The grid includes a vertical axis and a horizontal axis. The vertical axis comprises a plurality of labels corresponding to different treatments of the document. The horizontal axis comprises a plurality of labels corresponding to different values of time or jurisdiction. Each cell of the matrix of cells displays a graphical indication of the number of times that the treatment corresponding to the treatment label of the vertical axis associated with the cell occurred with respect to the horizontal axis label associated with the cell.

In yet another embodiment, a system for providing for display a two-dimensional graphical grid representation of the treatment of a document with respect to at least one variable includes a computing device that has a non-transitory memory component that stores a set of executable instructions that cause the computing device to receive a request to generate the two-dimensional graphical grid representation of the treatment of the document with respect to the at least one variable. In response to the received request, the set of executable instructions further cause the computing device to retrieve treatment information associated with the document with respect to the at least one variable from a database, generate a message containing the retrieved treatment information of the document with respect to the at least one variable, transmit the generated message, and provide for display the two-dimensional graphical grid representation of the treatment of the document with respect to the at least one variable based on the transmitted message.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Figure 4:
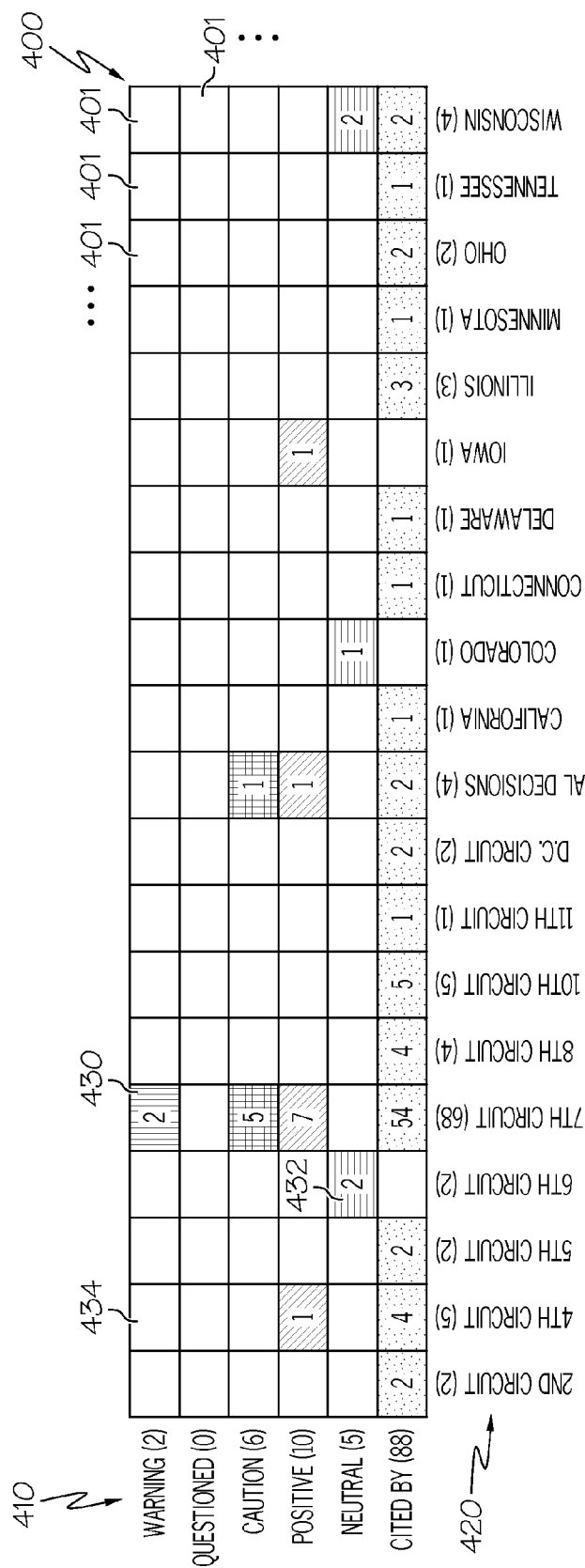
FIG. 4 depicts a schematic illustration of a two-dimensional graphical grid representation of the treatment of a legal document versus jurisdiction, according to one or more embodiments shown and described herein.
Figure 5:
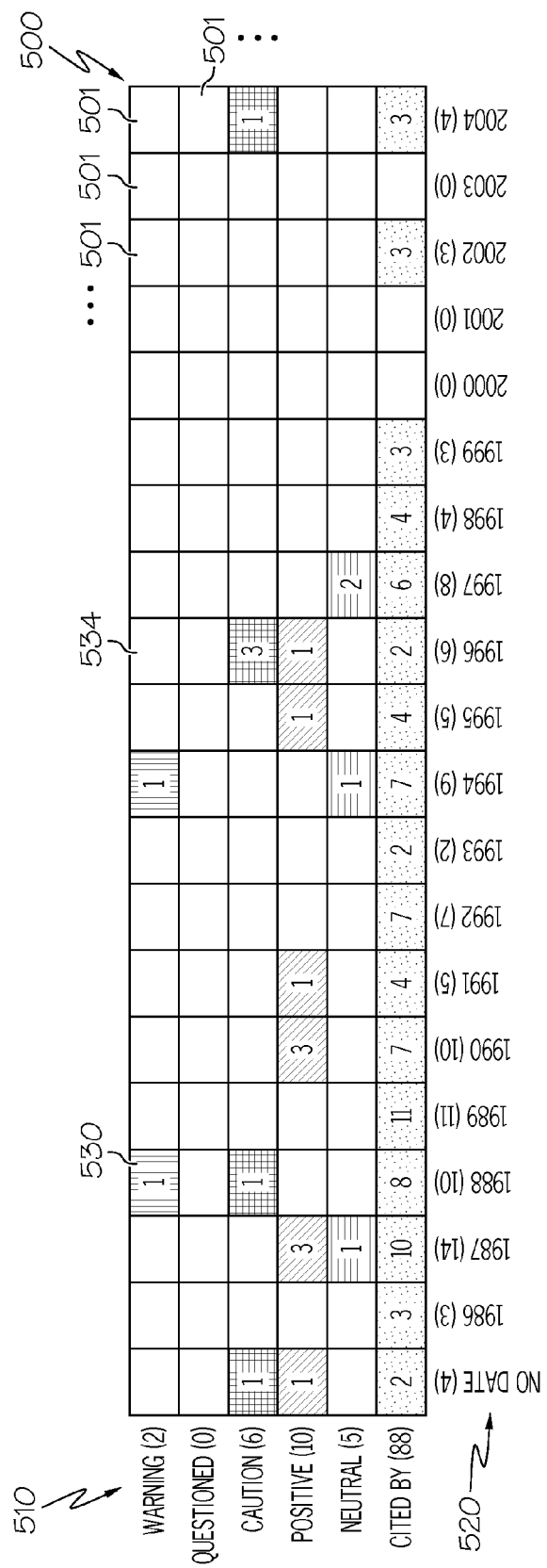
FIG. 5 depicts a schematic illustration of a two-dimensional graphical grid representation of the treatment of a legal document versus time, according to one or more embodiments shown and described herein.

Referring generally to the figures, particularly FIGS. 4 and 5, embodiments described herein are directed to systems and methods for generating a two-dimensional graphical grid representation of the treatment of a document. The embodiments described herein may receive from a user a request to generate a two-dimensional graphical grid representation of the treatment of a document over time, retrieve treatment information associated with the document from a database, generate a message containing the treatment information, and provide for display the two-dimensional graphical grid representation. The displayed two-dimensional graphical grid representation may permit a user to quickly, efficiently, and easily visualize and understand the treatment of a document with respect to at least one variable. Various embodiments of systems and methods for generating a two-dimensional graphical grid representation of the treatment of a document are described below.

Although the embodiments are described herein in the context of legal documents, it should be understood that embodiments are not limited thereto. For example, the systems and methods described herein may be utilized to generate two-dimensional graphical grid representations of the treatment of patent documents, legal documents, scientific research documents, news articles, journals, etc.

Figure 1:
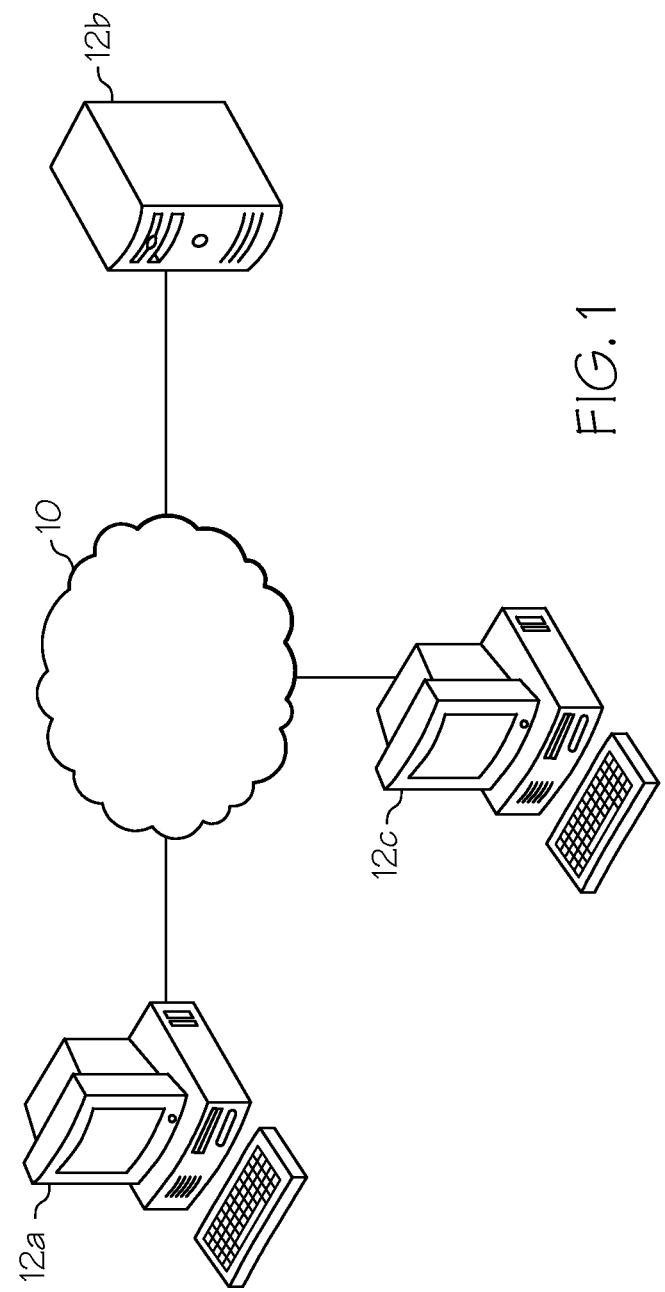
FIG. 1 depicts a schematic illustration of a computing network for a system for generating a two-dimensional graphical grid representation of the treatment of a document, according to one or more embodiments shown and described herein.

Referring now to the drawings, FIG. 1 depicts an exemplary computing network, illustrating components for a system for generating a two-dimensional graphical grid representation of the treatment of a document, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, and an administrator computing device 12c.

The user computing device 12a may be used by a user to generate a request for a two-dimensional graphical grid representation of the treatment of a document and to display the requested graphical representation. The user computing device 12a may also be utilized to perform other user functions, such as to provide a graphical user interface for interacting with the computing network and to display, or otherwise communicate, information to the user. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to transmit information to the user computing device 12a and/or the server computing device 12b.

It should be understood that while the user computing device 12a and the administrator computing device 12c are depicted as personal computers and the server computing device 12b is depicted as a server, these are nonlimiting examples. More specifically, in some embodiments any type of computing device (e.g., mobile computing device, personal computer, server, etc.) may be utilized for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, etc.

Figure 2:
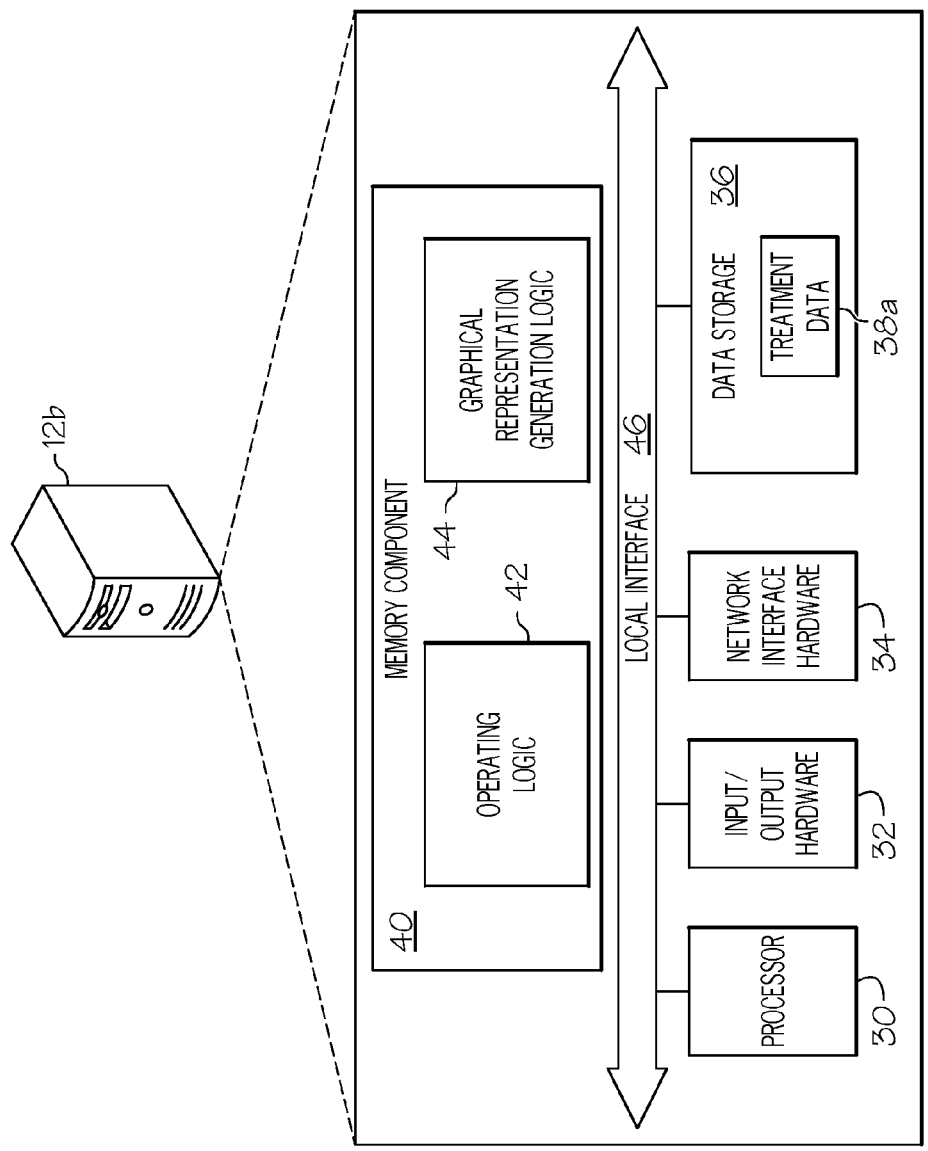
FIG. 2 depicts a schematic illustration of the server computing device from FIG. 1, further illustrating hardware and software that may be utilized in generating the two-dimensional graphical grid representation of the treatment of the document, according to one or more embodiments shown and described herein.

FIG. 2 depicts the server computing device 12b, from FIG. 1, further illustrating a system for generating a two-dimensional graphical grid representation of the treatment of a document, and/or a non-transitory computer-readable medium for generating a two-dimensional graphical grid representation of the treatment of a document embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein.

As also illustrated in FIG. 2, the server computing device 12b may include a processor 30, input/output hardware 32, network interface hardware 34, a data storage component 36 (which may store treatment data 38a), and a non-transitory memory component 40. The memory component 40 may be configured as volatile and/or nonvolatile computer readable medium and, as such, may include random access memory (including SRAM, DRAM, and/or other types of random access memory), hard disk drives (HDD), flash memory, registers, compact discs (CD), digital versatile discs (DVD), BLU-RAY discs, and/or other types of storage components. Additionally, the memory component 40 may be configured to store operating logic 42 and graphical representation generation logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (WI-FI) card, WIMAX card, mobile communications hardware, and/or other hardware for communicating with other networks and/or devices.

It should be understood that the data storage component 36 may reside local to and/or remote from the server computing device 12b and may be configured to store one or more pieces of data for access by the server computing device 12b and/or other components. As illustrated in FIG. 2, the data storage component 36 may store treatment data 38a. The treatment data 38a may be stored in one or more data storage devices.

Treatment data 38a may include at least one predefined treatment type to describe the manner in which a particular document was subsequently treated by documents that cite to the particular document (hereinafter "citing documents"). By way of example, and not by way of limitation, the citing documents may include court decisions (e.g., decisions issued by federal, state, or administrative courts), court documents (e.g., briefs or motions), statutes, law review articles, treatises, periodicals and/or journals. Treatment data 38a may also include citations, dates, court jurisdictions, pinpoint locations for where specific treatments occurred in a particular document, information pertaining to the cited documents referenced by the citing documents (e.g., headnote information), signal data, and/or other information pertinent to each citing document.

As noted above, treatment data 38a may include at least one predefined treatment type to describe the manner in which a particular document was subsequently treated by citing documents. The predefined treatment types may describe a manner in which a citing document characterized or otherwise referred to the particular document cited. In some embodiments, the predefined treatment types may generally indicate positive treatment, negative treatment, or neutral treatment. In other embodiments, the predefined treatment types may further differentiate between differing degrees of positive treatment and/or negative treatment, e.g., by utilizing a plurality of predefined treatment types that include specific predefined treatment types associated with each of multiple degrees of positive treatment and/or with each of multiple degrees of negative treatment. By way of example, and not by way of limitation, the possible predefined treatment types may include "Warning," "Questioned," "Caution," "Positive," "Neutral," or "Cited By." In one embodiment, treatment data 38a may include treatment information from a Shepard's® database. In other embodiments treatment data 38a may include treatment information outside of the Shepard's® database.

Included in the memory component 40 are the operating logic 42 and the graphical representation generation logic 44. The operating logic 42 may include an operating system and/or other software for managing components of the server computing device 12b. Similarly, the graphical representation generation logic 44 may reside in the memory component 40 and may be configured to facilitate generation of the two-dimensional graphical grid representation of the treatment of the document.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
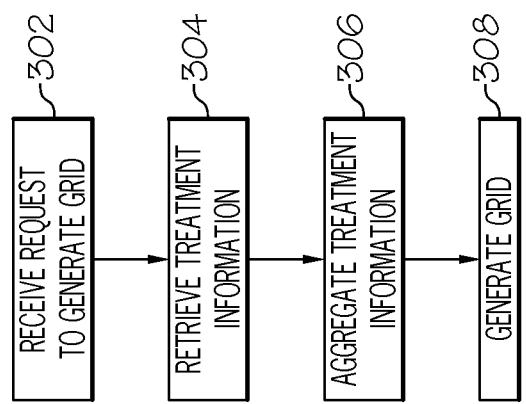
FIG. 3 depicts a flowchart graphically illustrating a method of generating a two-dimensional graphical grid representation of the treatment of a document, according to one or more embodiments shown and described herein.

Referring now to FIG. 3 (and FIGS. 1 and 2), a flowchart that graphically illustrates a method of generating a two-dimensional graphical grid representation of the treatment of a document according to one or more embodiments is provided. At block 302, the server computing device 12b may receive a request to generate a two-dimensional graphical grid representation of the treatment of a cited document from the user computing device 12a. In one embodiment, the user of user computing device 12a may be presented with a button or icon that the user may interact with in order to generate the request to display the grid. For example, the button may contain the text "Grid" to permit the user to select a grid view of the treatment of the document. In another embodiment, the button may include an icon that represents a grid. In response to interacting with (e.g., clicking on) the grid button or icon, or otherwise requesting a two-dimensional graphical grid representation of the treatment of a document, the user computing device 12a may generate a request to generate a grid, which is transmitted over the computer network 10 and received by server computing device 12b at block 302.

At block 304, the server computing device 12b may retrieve treatment information associated with the cited document. In one embodiment, the server computing device 12b may retrieve treatment information from the treatment data 38a located in data storage component 36. Treatment data 38a may be stored in an XML file associated with the cited document. In one embodiment, the XML file may contain the citing documents that cited with the cited document. The XML file may include a plurality of citing document nodes, each of which corresponds to a particular citing document. Each citing document node may include a treatment type, indicating the way in which that citing document treated the cited document. In the context of citing court decisions, each citing document node may also include an identifier of the court that issued the decision and a year of decision.

In one embodiment, treatment information may be retrieved from the XML file via an appropriate XQueries or other programmatic interaction with the XML file. The individual XQueries may be used to obtain, in a sorted order, the treatment information for all or a specific subset of the citing documents based on the specific request. Additional XQueries may be used such that, in the context of court decision citing documents that cite to a cited court decision, the retrieved treatment information may also include a name or identifier of the court and a year of the decision and may be formatted in such a manner to allow for the creation of two-dimensional graphical grids. Other XQueries may be used to allow for other citing documents to include sorted data in a format that may allow for creation of two-dimensional graphical grids. In other embodiments, still more XQueries may be used such that the retrieved information may include additional information associated with each citing document. In embodiments that store treatment data 38a in an XML file, the treatment data 38a may be accessed by a manner other than XQueries. It should also be understood that in other embodiments, the treatment data 38a may be stored in a format other than an XML file.

At block 306, the server computing device 12b may aggregate the retrieved treatment information. For example, to facilitate the display of a two-dimensional graphical grid representation of the treatment of a cited court decision by jurisdiction, the server computing device 12b may sum the number of times that citing documents from each jurisdiction treated the cited document with each treatment type. In one embodiment, the aggregated information may be stored in the form of a two-dimensional array, in which the two dimensions are treatment type and jurisdiction. The aggregation of the retrieved treatment information may include reducing the number of predefined treatment types by grouping certain predefined treatment types into broader treatment categories.

For example, the treatment types "concurring opinion," "dissenting opinion," and "explained" may represent differing degrees of neutral treatment and may accordingly be combined into a broader "neural" treatment category.

Similarly, to facilitate the display of a two-dimensional graphical grid representation of the treatment of a cited court decision over time, the server computing device 12b may sum the number of times that citing documents treated the cited document with each treatment type for each year. In one embodiment, the aggregated information may be stored in the form of a two-dimensional array, in which the two dimensions are treatment type and time. In one specific embodiment, the aggregated information may be stored in the form of a two-dimensional array, in which the two dimensions are treatment type and year. However, it should be understood that in an embodiment in which the two dimensions are treatment type and time, the time dimension may be a time period other than a year. As noted above, the aggregation of the retrieved treatment information may include reducing the number of predefined treatment types by grouping certain predefined treatment types into broader treatment categories.

While the flowchart of FIG. 3 describes aggregating the treatment information after retrieving the treatment information from treatment data 38a, in other embodiments, the aggregated treatment data may have been previously generated and stored in treatment data 38a. In such an embodiment, the aggregated treatment data could be directly retrieved from treatment data 38a without further processing.

At block 308, the server computing device 12b may generate the grid and provide it for display to the user of the user computing device 12a. In one embodiment, the grid may be generated based on the aggregated treatment information of block 306. For example, the server computing device 12b may generate and transmit a message containing the aggregated treatment information to a graphical display application or language (e.g., Microsoft Silverlight, Adobe FLASH, Javascript, etc.). The graphical display application may then receive the message and generate the two-dimensional graphical grid representation based on the aggregated treatment information contained in the received message. In other embodiments, graphical display applications or languages other than those specifically mentioned may be employed.

Although blocks 302-308 have been described as being separate tasks, in other embodiments, the blocks may be combined or omitted. Further, while the tasks of blocks 302-308 have been described as being performed in a particular order, in other embodiments, the tasks may be performed in a different order.

While the two-dimensional graphical grid representation has been described as being generated by the server computing device 12b in real-time in response to a request from the user computing device 12a, in other embodiments, the two-dimensional graphical grid representation may be generated ahead of time and stored, such that when a request to display the two-dimensional graphical grid representation is received by the server computing device 12b, the server computing device 12b can simply retrieve and provide for display the previously generated two-dimensional graphical grid representation.

Referring now to FIG. 4, a two-dimensional graphical grid representation of the treatment of a legal document versus jurisdiction is depicted. It should be understood that embodiments are not limited to the configurations of the graphical representations illustrated throughout the figures, and that other graphical representations are possible. In one embodiment, the computer network 10 is the Internet and the graphical representations described herein are presented to the user via a web browser.

As depicted in FIG. 4, the graphical representation substantially resembles a grid 400 comprising a matrix of cells 401. The graphical representation includes a vertical axis 410 and a horizontal axis 420. Vertical axis 410 comprises a plurality of textual labels, each of which corresponds to a different pre-defined treatment type of the document. In one embodiment, the pre-defined treatment types may include "Warning," "Questioned," "Caution," "Positive," "Neutral," and "Cited By." In other embodiments, other pre-defined treatment types may be displayed on the vertical axis. In still other embodiments, the vertical axis 410 may comprise a plurality of graphical icons, each of which corresponds to a different pre-defined treatment type of the document.

Horizontal axis 420 may comprises a plurality of textual labels that correspond to different jurisdictions or courts. Each jurisdiction label may correspond to a particular court. For example, the label "2nd Circuit" may correspond to the United States Court of Appeals for the Second Circuit. Each jurisdiction label may correspond to a group of courts. For example, in another embodiment, the label "2nd Circuit" may correspond to all federal courts within the appellate jurisdiction of the Second Circuit. In yet another embodiment, the label "2nd Circuit" may include the United States Court of Appeals for the Second Circuit, along with all federal courts within the appellate jurisdiction of the Second Circuit. The label "Ohio" may correspond to all state courts in Ohio. In other embodiments, horizontal axis 420 may comprise a plurality of graphical icons, each of which corresponds to a different jurisdiction or court. It should be understood that the embodiments described herein are not limited to the jurisdictions illustrated in FIG. 4.

Still referring to FIG. 4, each cell of the matrix of cells may communicate a graphical indication of the number of times that a particular treatment type of the corresponding vertical axis label occurred with respect to the court of the corresponding horizontal axis label. For example, cell 430 may display the number "2" to indicate that two courts in the 7th Circuit treated the legal document with a "Warning" analysis. Cell 432 may display the number "2" to indicate that two courts in the 6th Circuit treated the legal document with a "Neutral" analysis. A cell may be displayed as blank if there are no treatments associated with it. For example, cell 434 may be displayed as blank to indicate that there were no decisions in the 4th Circuit that treated the document with a "Warning" analysis. In one embodiment, a cell may be displayed as blank by displaying a white background color, though in other embodiments the cell may be displayed as blank by displaying a background color other than white, or by indicating that the cell is blank in a manner other than by the displayed background color.

In some embodiments, the background color of each cell of the matrix may be based on the treatment row of the matrix in which the cell resides. For example, each non-blank cell of a treatment row may be displayed with the same background color. The background color of the non-blank cells within a particular treatment row may be different from the background color of the non-blank cells in other treatment rows. Referring to FIG. 4, the non-blank cells of the "Warning" treatment row may be displayed with a red background color, for example. The non-blank cells of the "Questioned" treatment row may be displayed with an orange background color. The non-blank cells of the "Caution" treatment row may be displayed with a yellow background color. The non-blank cells of the "Positive" treatment row may be displayed with a green background color. The non-blank cells of the "Neutral" treatment row may be displayed with a blue background color. The non-blank cells of the "Cited By" treatment row may be displayed with a black or grey background color. In other embodiments, the background color of each treatment row may differ from those specifically described above. In still other embodiments, the background color of non-blank cells may be the same, regardless of treatment row.

Each of the plurality of predefined-treatment labels displayed on the vertical axis 410 may also include a treatment total that represents the sum of the cells within the matrix corresponding to that particular treatment (e.g., the total number of that particular treatment across all courts). For example, the parenthetical "(10)" displayed after the "Positive" treatment label indicates that there are a total of 10 instances in which a court analyzed the case "Positive" manner (1 positive treatment by $4^{th}$ Circuit courts, 7 positive treatments by $7^{th}$ Circuit courts, 1 positive treatment by Other Federal Decisions, and 1 positive treatment by Iowa courts).

Similarly, each of the court labels displayed on the horizontal axis 420 may also include a treatment total that represents the sum of the cells within the matrix corresponding to the number of treatments by that particular court (e.g., the total number of times that the court cited the legal document). For example, the parenthetical "(5)" displayed after the "4th Circuit" label indicates that there are 5 courts in the $4^{th}$ Circuit that cited to the legal document (4 "Cited By" treatments and 1 "Positive" treatment).

The cells of the matrix may enable a user to view a list of the citing documents associated with the treatment type and jurisdiction associated with the cell. For example, a list of the citing documents associated with a particular cell may be generated and displayed to the user in response to the user clicking on or otherwise interacting with the cell. In one embodiment, when the user clicks on or otherwise interacts with a particular cell, a list of the citing documents associated with that treatment row and the jurisdiction column of the cell may be displayed as a list. In order to generate the list of citing documents to display, the entire universe of citing documents may be filtered by both the treatment type associated with the cell's row in the matrix and the jurisdiction associated with the cell's column in the matrix. By way of example, if a user clicks on cell 430, a list of the "Positive" citing decisions from the 7th Circuit may be displayed to the user. Each displayed decision in the list of "Positive" citing document from the 7th Circuit may include a case name or other identifier of the decision, a citation for the decision, the name of the court that issued the decision, or the year that the decision was issued. The displayed list of citing documents associated with the cell may also indicate the particular portion of the cited document that cited the document. In other embodiments, more or less information associated with each citing document in the generated list of citing documents may be displayed.

The treatment labels of the vertical axis 410 may enable a user to view a list of the citing documents associated with that treatment type. For example, a list of all the citing documents associated with a particular treatment type may be generated and displayed to the user in response to the user clicking on or otherwise interacting with the treatment label associated with that treatment type. In one embodiment, when the user clicks on or otherwise interacts with a particular treatment label, a list of the citing documents associated with that treatment label may be displayed as a list. In order to generate the list of citing documents to display, the entire universe of citing documents may be filtered by the treatment type associated with the treatment label. By way of example, if a user clicks on the "Neutral (5)" treatment label, a list containing the 2 neutral 6th Circuit citing decisions, the 1 neutral Colorado decision, and the 2 neutral Wisconsin citing decisions may be displayed.

Similarly, the jurisdiction labels of the horizontal axis 420 may enable a user to view a list of the citing documents associated with that jurisdiction. For example, a list of all the citing documents associated with a particular jurisdiction may be generated and displayed to the user in response to the user clicking on or otherwise interacting with that particular jurisdiction label. In one embodiment, when the user clicks on or otherwise interacts with a particular jurisdiction label, a list of the citing documents associated with that jurisdiction label may be displayed as a list. In order to generate the list of citing documents to display, the entire universe of citing documents may be filtered by jurisdiction. By way of example, if a user clicks on the "7th Circuit (68)" jurisdiction label, a list containing the 54 "Cited By" 7th Circuit citing decisions, the 7 "Positive" 7th Circuit citing decisions, the 5 "Caution" 7th Circuit citing decisions, and the 2 "Warning" 7th Circuit citing decisions may be displayed.

Referring now to FIG. 5, a two-dimensional graphical grid representation of the treatment of a legal document versus time is depicted. As depicted in FIG. 5, the graphical representation substantially resembles a grid 500 comprising a matrix of cells 501. The graphical representation includes a vertical axis 510 and a horizontal axis 520. Vertical axis 510 comprises a plurality of textual labels, each of which corresponds to a different pre-defined treatment type of the document. In one embodiment, the pre-defined treatment types may include "Warning," "Questioned," "Caution," "Positive," "Neutral," and "Cited By." In other embodiments, other pre-defined treatment types may be displayed on the vertical axis. In still other embodiments, the vertical axis 510 may comprise a plurality of graphical icons, each of which corresponds to a different pre-defined treatment type of the document.

Horizontal axis 520 may comprise a plurality of textual labels that correspond to different years or other measures of time. Each year label may correspond to a particular date. For example, the label "1986" may correspond to citing documents from the year 1986. The label "No Date" may correspond to citing documents for which no year is ascertainable. In other embodiments, horizontal axis 520 may comprise a plurality of graphical icons, each of which corresponds to a different year or other measure of time.

Still referring to FIG. 5, each cell of the matrix of cells may communicate a graphical indication of the number of times that a particular treatment type of the corresponding vertical axis label occurred in the respective year of the corresponding horizontal axis year label. For example, cell 530 may display the number "1" to indicate that one citing document treated the legal document with a "Warning" analysis in 1988. A cell may be displayed as blank if there are no treatments associated with it. For example, cell 534 may be displayed as blank to indicate that there were no 1996 decisions that treated the document with a "Warning" analysis. In one embodiment, a cell may be displayed as blank by displaying a white background color, though in other embodiments the cell may be displayed as blank by displaying a background color other than white, or by indicating that the cell is blank in a manner other than by the displayed background color.

In some embodiments, the background color of each cell of the matrix may be based on the treatment row of the matrix in which the cell resides. For example, each non-blank cell of a treatment row may be displayed with the same background color. The background color of the non-blank cells within a particular treatment row may be different from the background color of the non-blank cells in other treatment rows. Referring to FIG. 5, the non-blank cells of the "Warning" treatment row may be displayed with a red background color, for example. The non-blank cells of the "Questioned" treatment row may be displayed with an orange background color. The non-blank cells of the "Caution" treatment row may be displayed with a yellow background color. The non-blank cells of the "Positive" treatment row may be displayed with a green background color. The non-blank cells of the "Neutral" treatment row may be displayed with a blue background color. The non-blank cells of the "Cited By" treatment row may be displayed with a black or grey background color. In other embodiments, the background color of each treatment row may differ from those specifically described above. In still other embodiments, the background color of non-blank cells may be the same, regardless of treatment row.

Each of the plurality of predefined-treatment labels displayed on the vertical axis 510 may also include a treatment total that represents the sum of the cells within the matrix corresponding to that particular treatment (e.g., the total number of that particular treatment across all courts). For example, the parenthetical "(10)" displayed after the "Positive" treatment label indicates that there are a total of 10 instances in which a court analyzed the case "Positive" manner (1 positive treatment with no date ascertainable, 3 positive treatments in 1987, 3 positive treatments in 1990, 1 positive treatment in 1991, 1 positive treatment in 1995, and 1 positive treatment in 1996).

Similarly, each of the year labels displayed on the horizontal axis 520 may also include a treatment total that represents the sum of the cells within the matrix corresponding to the number of treatments in that year (e.g., the total number of citing documents fro that year). For example, the parenthetical "(14)" displayed after the "1987" label indicates that there are 14 citing documents from 1987 (10 "Cited By" treatments, 1 "Neutral" treatment, and 3 "Positive" treatments).

Still referring to FIG. 5, the cells of the matrix may enable a user to view a list of the citing documents associated with the treatment type and year associated with the cell. For example, a list of the citing documents associated with a particular cell may be generated and displayed to the user in response to the user clicking on or otherwise interacting with the cell. In one embodiment, when the user clicks on or otherwise interacts with a particular cell, a list of the citing documents associated with that treatment row and the year column of the cell may be displayed as a list. In order to generate the list of citing documents to display, the entire universe of citing documents may be filtered by both the treatment type associated with the cell's row in the matrix and the year associated with the cell's column in the matrix. By way of example, if a user clicks on cell 530, a list of the "Warning" citing decisions from 1988 may be displayed to the user.

The treatment labels of the vertical axis 510 may enable a user to view a list of the citing documents associated with that treatment type. For example, a list of all the citing documents associated with a particular treatment type may be generated and displayed to the user in response to the user clicking on or otherwise interacting with the treatment label associated with that treatment type. In one embodiment, when the user clicks on or otherwise interacts with a particular treatment label, a list of the citing documents associated with that treatment label may be displayed as a list. In order to generate the list of citing documents to display, the entire universe of citing documents may be filtered by the treatment type associated with the treatment label. By way of example, if a user clicks on the "Caution (6)" treatment label, a list containing the 1 "Caution" citing decision with no date ascertainable, the 1 "Caution" 1998 citing decision, the 3 "Caution" 1996 citing decisions, and the 1 "Caution" 2004 citing decision may be displayed.

Similarly, the year labels of the horizontal axis 520 may enable a user to view a list of the citing documents from that year. For example, a list of all the citing documents from a particular year may be generated and displayed to the user in response to the user clicking on or otherwise interacting with that particular year label. In one embodiment, when the user clicks on or otherwise interacts with a particular year label, a list of the citing documents from that year may be displayed as a list. In order to generate the list of citing documents to display, the entire universe of citing documents may be filtered by year. By way of example, if a user clicks on the "1990 (10)" year label, a list containing the 7 "Cited By" 1990 citing decisions and the 3 "Positive" 1990 citing decisions may be displayed.

It should be understood that the at least one variable of the horizontal axis may be a variable other than jurisdiction or time/year. In other embodiments, the citing decisions may be grouped into categories other than year or jurisdiction, such that the two-dimensional graphical grid representation of the treatment of a document is with respect to another variable/category.

While the embodiments described herein have been described with reference to a horizontal axis corresponding to a first dimension and a vertical axis corresponding to a second dimension, in other embodiments, the dimensions corresponding to the horizontal axis and vertical axis may be reversed.

It should be understood that embodiments described herein provide for systems and methods for generating a two-dimensional graphical grid representation of the treatment of a document. The graphical representation may enable a user to quickly, efficiently, and easily visualize and understand the treatment of a document with respect to at least one variable. In the context of a two-dimensional graphical grid representation of the treatment of a legal document by jurisdiction, the grid may encapsulate and summarize the treatment of the legal document by different jurisdictions, in order to enable a user to quickly and easily visually identify disparate treatments of the legal document among different jurisdictions by a quick visual inspection of the grid. Similarly, in the context of a two-dimensional graphical grid representation of the treatment of a legal document by date, the grid may encapsulate and summarize the treatment of the legal document over time, in order to enable a user to quickly and easily visually identify any possible evolution in the treatments of the legal document over time by a quick visual inspection of the grid. The grid may also allow a user to interactively drill down and analyze the information encapsulated by the grid, for example, by: generating a list of pertinent citing documents that are associated with a clicked cell of the matrix; generating a list of all citing documents associated with a clicked row of the matrix; or generating a list of all citing documents associated with a clicked column of the matrix. Further, the systems and methods described herein may enhance user confidence in the broad understanding of the treatment of a document.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for providing for display a two-dimensional graphical grid representation of the treatment of a document with respect to at least one variable, the method comprising:
receiving a request to generate the two-dimensional graphical grid representation of the treatment of the document with respect to the at least one variable;
in response to the received request, retrieving, by a computer, treatment information associated with the document with respect to the at least one variable from a database;
generating a message containing the retrieved treatment information of the document with respect to the at least one variable;
transmitting the generated message; and
providing for display the two-dimensional graphical grid representation of the treatment of the document with respect to the at least one variable based on the transmitted message, wherein the two-dimensional graphical grid representation graphically distinguishes among a plurality of different treatment types pertaining to the document, wherein each of the plurality of treatment types is indicative of a manner in which the document was treated by one or more citing documents;
wherein the two-dimensional graphical grid representation comprises a matrix of cells, a first axis, and a second axis;
wherein the first axis comprises a plurality of labels corresponding to different treatments of the document;
wherein the second axis comprises a plurality of labels corresponding to different values of the at least one variable; and
wherein at least one cell of the matrix of cells displays a first graphical indication of a first number of times that a first treatment corresponding to a first axis treatment label associated with the first cell occurred with respect to a second axis label associated with the first cell, wherein the first number of times is greater than one.

2. The method of claim 1 wherein:
the plurality of different treatment types includes a positive treatment type and a negative treatment type;
the positive treatment type is indicative of at least one of the one or more citing documents treating the document positively;
the negative treatment type is indicative of at least one of the one or more citing documents treating the document negatively; and
the two-dimensional graphical grid representation graphically distinguishes between the at least one of the one or more citing documents treating the document positively and the at least one of the one or more citing documents treating the document.

3. The method of claim 1 wherein the at least one variable is time.

4. The method of claim 1 wherein the at least one variable is jurisdiction.

5. The method of claim 1 further comprising aggregating the retrieved treatment data.

6. The method of claim 1 wherein the first axis is a vertical axis and the second axis is a horizontal axis, such that:
the vertical axis comprises the plurality of labels corresponding to different treatments of the document; and
the horizontal axis comprises the plurality of labels corresponding to different values of the at least one variable.

7. The method of claim 6 wherein each cell of the matrix of cells displays a graphical indication of the number of times that the treatment corresponding to the treatment label of the vertical axis associated with the cell occurred with respect to the horizontal axis label associated with the cell.

8. The method of claim 7 wherein cells of the matrix that are associated with zero treatments are displayed as blank.

9. The method of claim 7 wherein each treatment label of the vertical axis includes a treatment total that represents the sum of all cells within a row of the matrix of cells that corresponds to the treatment label, and each horizontal axis label includes a value total that represents the sum of all cells within a column of the matrix of cells that corresponds to the horizontal axis label.

10. The method of claim 7 wherein a color of at least one cell of the matrix is based on the row of the matrix in which the at least one cell resides.

11. The method of claim 7 wherein all non-zero cells of a first row of cells are a first color, all non-zero cells of a second row of cells are a second color, and the first color is different from the second color.

12. The method of claim 7 further comprising:
in response to the selection of one of the cells of the matrix of cells by a user, filtering the list of all treatments associated with the document to generate a subset of treatments, wherein the subset of treatments includes only those treatments associated with the selected cell; and
providing for display the subset of treatments in response to the user selection.

13. The method of claim 7 further comprising:
in response to the selection of one of the labels of the vertical axis or of the horizontal axis by a user, filtering the list of all treatments associated with the document to generate a subset of treatments, wherein the subset of treatments includes only those treatments associated with the row of the selected vertical axis label or with the column of the selected horizontal axis label; and
providing for display the subset of treatments in response to the user selection.

14. A system for providing for display a two-dimensional graphical grid representation of the treatment of a document with respect to at least one variable, the system comprising:
a computing device that comprises a non-transitory memory component that stores a set of executable instructions that cause the computing device to:
receive a request to generate the two-dimensional graphical grid representation of the treatment of the document with respect to the at least one variable;
in response to the received request, retrieve, by a computer, treatment information associated with the document with respect to the at least one variable from a database;
generate a message containing the retrieved treatment information of the document with respect to the at least one variable;
transmit the generated message; and
provide for display the two-dimensional graphical grid representation of the treatment of the document with respect to the at least one variable based on the transmitted message, wherein the two-dimensional graphical grid representation graphically distinguishes among a plurality of different treatment types pertaining to the document, wherein each of the plurality of treatment types is indicative of a manner in which the document was treated by one or more citing documents;

wherein the two-dimensional graphical grid representation comprises a matrix of cells, a first axis, and a second axis;

wherein the first axis comprises a plurality of labels corresponding to different treatments of the document;

wherein the second axis comprises a plurality of labels corresponding to different values of the at least one variable; and wherein at least one cell of the matrix of cells displays a first graphical indication of a first number of times that a first treatment corresponding to a first axis treatment label associated with the first cell occurred with respect to a second axis label associated with the first cell, wherein the first number of times is greater than one.

15. A method for providing for display a grid comprising a matrix of cells, wherein the grid is a two-dimensional graphical representation of the treatment of a legal document with respect to time or jurisdiction, the method comprising:

receiving a request to generate the grid;

in response to the received request, retrieving, by a computer, treatment information associated with the legal document with respect to time or jurisdiction from a database;

generating a message containing the retrieved treatment information of the legal document with respect to time or jurisdiction;

transmitting the generated message; and providing for display the grid based on the transmitted message, wherein the grid includes a vertical axis and a horizontal axis, wherein:

the vertical axis comprises a plurality of labels corresponding to different treatments of the document;

the horizontal axis comprises a plurality of labels corresponding to different values of time or jurisdiction;

each cell of the matrix of cells displays a graphical indication of the number of times that the treatment corresponding to the treatment label of the vertical axis associated with the cell occurred with respect to the horizontal axis label associated with the cell; and at least one cell of the matrix of cells displays a first graphical indication of a first number of times that a first treatment corresponding to a vertical axis treatment label associated with the first cell occurred with respect to a horizontal axis label associated with the first cell, wherein the first number of times is greater than one.

16. The method of claim 15 further comprising:

in response to the selection of one of the cells of the matrix of cells by a user, filtering the list of all treatments associated with the document to generate a subset of treatments, wherein the subset of treatments includes only those treatments associated with the selected cell; and providing for display the subset of treatments in response to the user selection.

17. The method of claim 15 further comprising:

in response to the selection of one of the labels of the vertical axis or of the horizontal axis by a user, filtering the list of all treatments associated with the document to generate a subset of treatments, wherein the subset of treatments includes only those treatments associated with the row of the selected vertical axis label or with the column of the selected horizontal axis label; and providing for display the subset of treatments in response to the user selection.

18. The method of claim 15 wherein each treatment label of the vertical axis includes a treatment total that represents the sum of all cells within a row of the matrix of cells that corresponds to the treatment label, and each horizontal axis label includes a value total that represents the sum of all cells within a column of the matrix of cells that corresponds to the horizontal axis label.

19. The method of claim 15 wherein a color of at least one cell of the matrix is based on the row of the matrix in which the at least one cell resides.

* * * * *